(12) United States Patent
Yamazaki

(10) Patent No.: US 8,228,519 B2
(45) Date of Patent: Jul. 24, 2012

(54) IMAGE PROCESSING SYSTEM, IMAGE PROCESSING METHOD AND OBJECT NAME GENERATION PROGRAM

(75) Inventor: Hideyuki Yamazaki, Sagamihara (JP)

(73) Assignee: Konica Minolta Business Technologies, Inc. (JP)

( * ) Notice: Subject to any disclaimer, the term of this patent is extended or adjusted under 35 U.S.C. 154(b) by 657 days.

(21) Appl. No.: 12/405,933

(22) Filed: Mar. 17, 2009

(65) Prior Publication Data

US 2009/0310156 A1    Dec. 17, 2009

(30) Foreign Application Priority Data

Jun. 16, 2008  (JP) .................. 2008-157003

(51) Int. Cl.
*G06F 3/12*    (2006.01)
(52) U.S. Cl. ....... 358/1.13; 707/741; 707/755; 707/769; 358/1.16; 358/448; 358/462; 382/199; 382/203; 382/305
(58) Field of Classification Search .......... 358/1.13, 358/1.16, 448, 462; 707/741, 755, 769; 382/199, 382/203, 305
See application file for complete search history.

(56) References Cited

U.S. PATENT DOCUMENTS

2006/0192982 A1 *  8/2006  Ogasawara .................. 358/1.9

FOREIGN PATENT DOCUMENTS

| JP | 2002-099481 | 4/2002 |
|---|---|---|
| JP | 2006-098656 | 4/2006 |
| JP | 2006-243816 | 9/2006 |
| JP | 2007-083556 | 4/2007 |
| JP | 2007-130943 | 5/2007 |

OTHER PUBLICATIONS

English Machine Translation of JP 2006-098656-A (Shingo, published Apr. 13, 2006).*
English Machine Translation of JP 2007-083556-A (Kasai, published Apr. 5, 2007).*
Notification of Reason for Refusal for appl. No. 2008-157003, mailed Apr. 22, 2010, 3 pgs.
Translation of Notification of Reason for Refusal for appl. No. 2008-157003, mailed Apr. 22, 2010, 3 pgs.

* cited by examiner

*Primary Examiner* — Benny Q Tieu
*Assistant Examiner* — Juan Guillermety
(74) *Attorney, Agent, or Firm* — Squire Sanders (US) LLP

(57) ABSTRACT

There is described an image processing system, which makes it possible not only to prevent the system from generating printing errors, but also to increase the reuse ratio of the object. The system includes a first apparatus that generates first data for designating a first job and a second apparatus that rasterizes a plurality of objects based on the first data generated by the first apparatus so as to synthesize the plurality of objects. The first apparatus generates an object name of each of the plurality of objects by utilizing information pertaining to the concerned object. The second apparatus stores a plurality of rasterized objects into a cache memory, and registers object names into a table. The first apparatus inquires whether object names of rasterized objects to be used in the next job are registered in the table from the second apparatus, to add an unregistered object to data.

7 Claims, 9 Drawing Sheets

IMAGE PROCESSING SYSTEM, IMAGE PROCESSING METHOD AND OBJECT NAME GENERATION PROGRAM

This application is based on Japanese Patent Application No. 2008-157003 filed on Jun. 16, 2008, with Japan Patent Office, the entire content of which is hereby incorporated by reference.

BACKGROUND OF THE INVENTION

The present invention relates to an image processing system, an image processing method and an object name generation program, and specifically relates to the image processing system, the image processing method and the object name generation program, each of which reuses an object.

In recent years, there have been increasingly proliferated in the market various kinds of printing apparatuses, such as a printer, a Multi Function Peripheral (MFP), etc., (hereinafter, referred to as an image forming apparatus as a general term for each of them). When an image forming apparatus is employed for conducting a printing operation, the image forming apparatus parses concerned print data written in the Page Description Language and applies the bitmap developing processing (rasterizing operation) to the print data for every page so as to create image data, and then, implements the printing operation based on the image data created.

In this connection, it is no need to repeatedly create image data for every print product when producing plural copies of the print products in the normal printing mode; however, it is necessary to conduct the rasterizing operation for every print product so as to create the image data, in a case where the printing operation is conducted with changing the objects (contents), such as character contents, image contents, etc., sequentially (generally speaking, this printing mode is called the "variable printing"). Accordingly, since the process of the rasterizing operation requires much time, there has been arisen such a problem that the processing efficiency of the system concerned has deteriorated as a whole.

To solve the abovementioned problem, there has been employed such a method for improving the processing efficiency in which: the objects (contents) to be assigned to each of the pages are classified into those to be employed only once within a single print job, and those to be repeatedly employed within the single print job (hereinafter, referred to as reusable objects); the reusable objects are rasterized so as to store the created image data into a cache memory; and reusing the image data of the reusable objects stored in the cache memory (for instance, set forth in Japanese Non-Examined Laid-Open Patent Publication No. 2006-243816).

In this connection, at the time when reusing the object, if no rasterized object that linked with the object name concerned can be found, the reusing operation is determined as an "error state". Conventionally, to avoid this error, such a superficial name as a "File 1" (a simple name for the purpose of discriminating the concerned object from other objects) is attached to the object so as to distinguish the concerned object from other objects.

However, since it is impossible to appreciate the contents of the object only by using the superficial name, an erroneous printing may occur due to an incorrect selection of an object other than the object intended by the user, in such a case where plural objects have the same name but are different from each other in resolutions and/or clipping areas, or in a case where they have the same resolution and the same image size but are different from each other in color modes, or the like.

Accordingly, according to the conventional method to solve the problem of the object selecting error mentioned in the above, an effective range is established for each of the objects, so as to make it possible to reuse each of them only within the effective range established. When the effective range is established for an object, however, there arises another problem that it is impossible to effectively reuse the object stored in the cache memory. For instance, in the printer A, even in such a case that, after object 1 has been used in print job 1, the same object 1 is to be used in print job 2 next to print job 1, object 1 should be rasterized again in print job 2.

SUMMARY

To overcome the abovementioned drawbacks in conventional systems, it is one of objects of one perspective of the present invention to provide a novel image an image processing system, image processing method, and object name generation program. It is a more specific object of the present invention to provide an image processing system, an image processing method and an object name generation program, which makes it possible not only to prevent the system from generating printing errors, but also to increase the reuse ratio (reuse opportunities) of the object.

Accordingly, at least one of the objects and other objects of the present invention can be attained by any one of the image processing systems described as follows.

(1) According to an image processing system reflecting an aspect of the present invention, the image processing system, comprises: a first apparatus that generates first data for designating a first job; and a second apparatus that rasterizes a plurality of objects based on the first data generated by the first apparatus so as to synthesize the plurality of objects; wherein, with respect to each of the plurality of objects, the first apparatus generates an object name of a concerned object according to a predetermined rule, by utilizing information pertaining to the concerned object and including such information that is necessary for rasterizing the concerned object; and wherein the second apparatus stores a plurality of rasterized objects, acquired by rasterizing the plurality of objects, into a cache memory, and registers object names, respectively generated with respect to the plurality of rasterized objects, into a table; and wherein, when generating second data for designating a second job being not prior to the first job, the first apparatus inquires whether or not object names of rasterized objects to be used in the second job are registered in the table from the second apparatus, so as to add an object unregistered in the table to the second data.

(2) According to another aspect of the present invention, in the image processing system recited in item 1, the information pertaining to the concerned object includes at least one of a width of image represented by the concerned object, a height of image represented by the concerned object, information for specifying a clipping position when clipping a part of image, information for specifying an image processing operation when enlarging, reducing and/or rotating an image represented by the concerned object, a device name of an apparatus that outputs the concerned object, a resolution and a color mode.

(3) According to still another aspect of the present invention, in the image processing system recited in item 1, the second apparatus calculates a weight of each of the plurality of rasterized objects, which is stored in the cache memory and an object name of which is registered in the table, based on at least one of predetermined parameters indicating necessity for storing the concerned object into the cache memory, so as to delete a specific object, whose necessity is relatively low, from the cache memory, and to delete an object name of the specific object from the table.

(4) According to yet another aspect of the present invention, in the image processing system recited in item 3, the predetermined parameters includes at least one of a number of times using the concerned object, a size of the concerned object and a type of the concerned object.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

As aforementioned in the "BACKGROUND OF THE INVENTION", the processing efficiency of the variable printing can be improved by increasing the reuse ratio (reuse opportunities) of the rasterized object. However, since the effective range of the object to be used for the PPML (Personalized Print Markup Language) or the like is specified in advance, and therefore, the concerned object is deleted from the cache memory at the time when the object is out of range, the concerned object cannot be reused after that time. On the other hand, the global object is defined as a special object for which no effective range is specified, and is guaranteed as a reuse-free object that is available at anytime. Accordingly, if the object other than the global object could be also handled in the same manner as handling the global object, it would be possible to improve the processing efficiency of the variable printing.

However, when a lot of objects, to which superficial names (different simple names for the purpose of discriminating the concerned objects from each other) are respectively attached, are stored in the cache memory, since it is impossible to appreciate the contents of each object only by using corresponding one of the superficial names, the object selecting error is liable to occur, and an object other than the object intended by the user, would be erroneously superimposed, resulting in an erroneous printing.

To overcome the abovementioned drawbacks in the conventional image processing systems, according to the preferred embodiment of the present invention, with respect to each of the objects to be employed, the object name is created in accordance with the predetermined rule by utilizing information pertaining to the object concerned. Then, the rasterized object is stored into the cache memory while correlating it with the object name created in the above. As a result, it becomes possible not only to prevent the variable printing from occurrence of the erroneous printing, but also to reuse a lot of objects effectively.

<Embodiment>

Figure 1:
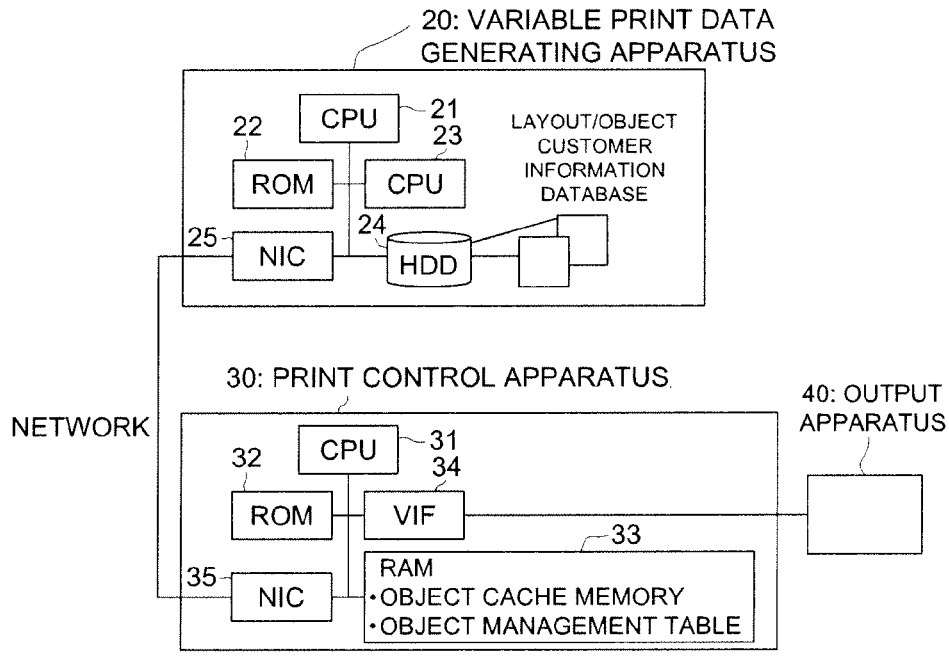
FIG. 1 shows a block diagram of a configuration of a variable printing system embodied in the present invention.
Figure 2:
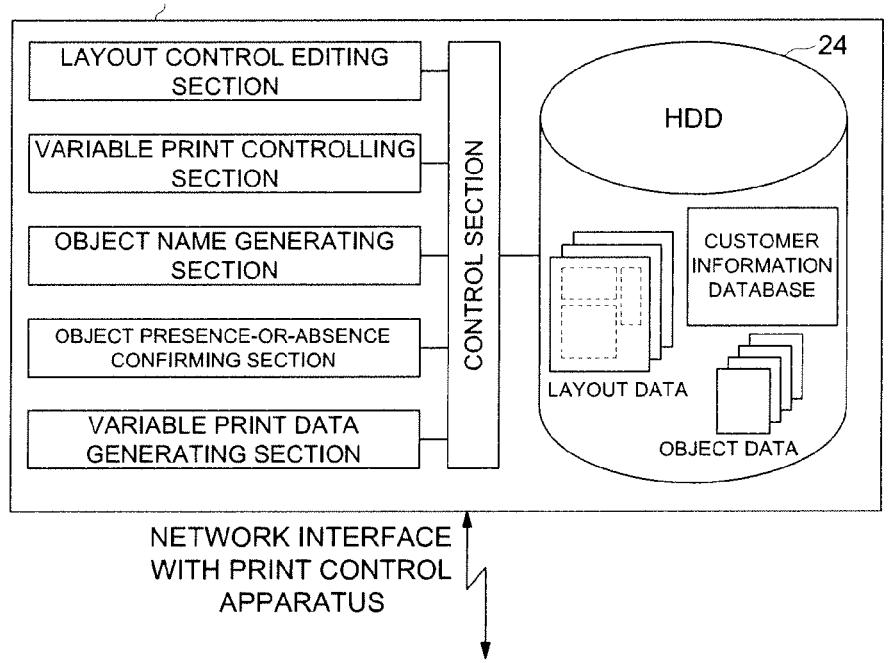
FIG. 2 shows a block diagram indicating a configuration of various programs installed in a variable print data generating apparatus embodied in the present invention.
Figure 3:
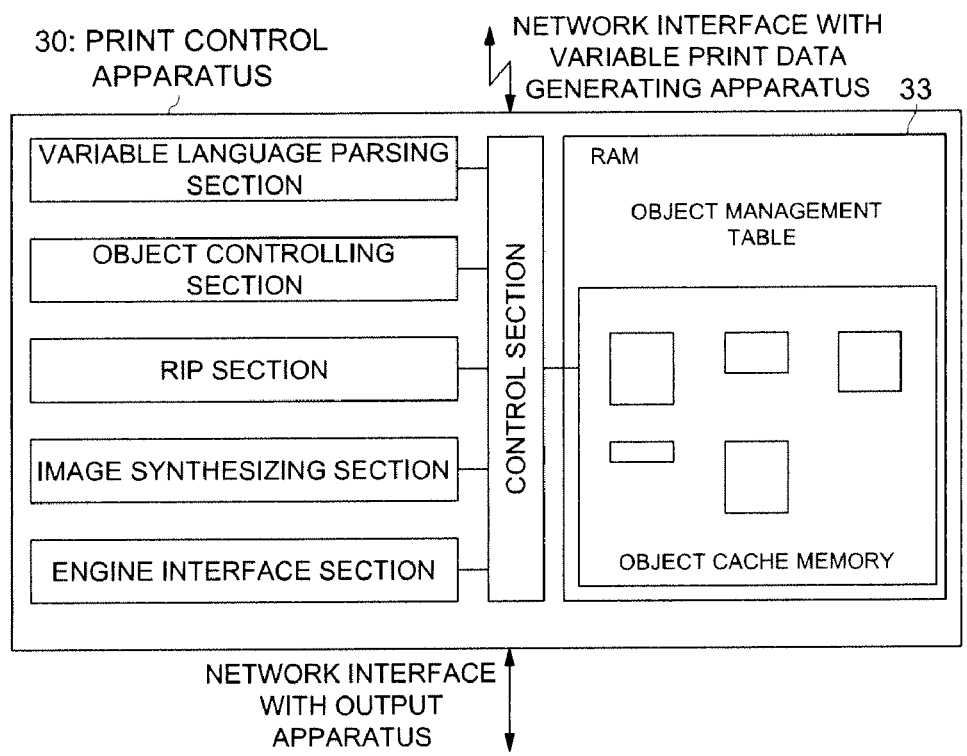
FIG. 3 shows a block diagram indicating a configuration of various programs installed in a print control apparatus embodied in the present invention.
Figure 4:
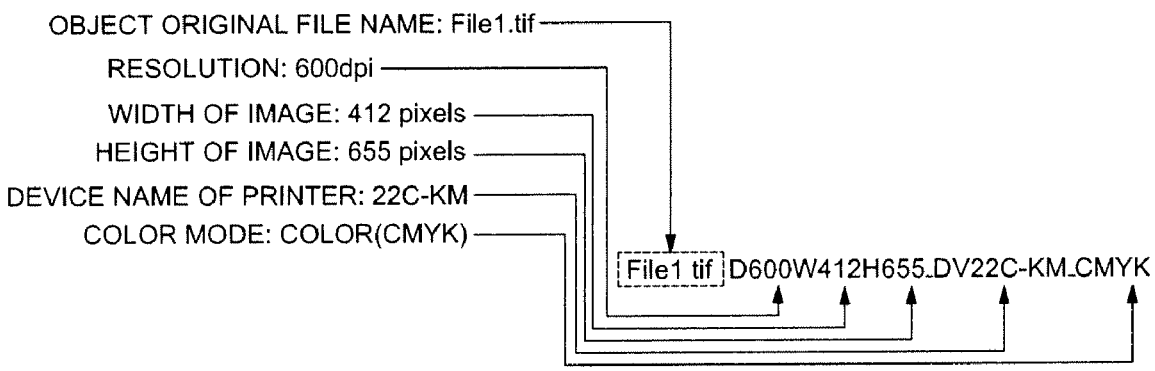
FIG. 4 shows an explanatory schematic diagram for explaining a method for attaching a name to an object, embodied in the present invention.
Figure 5:
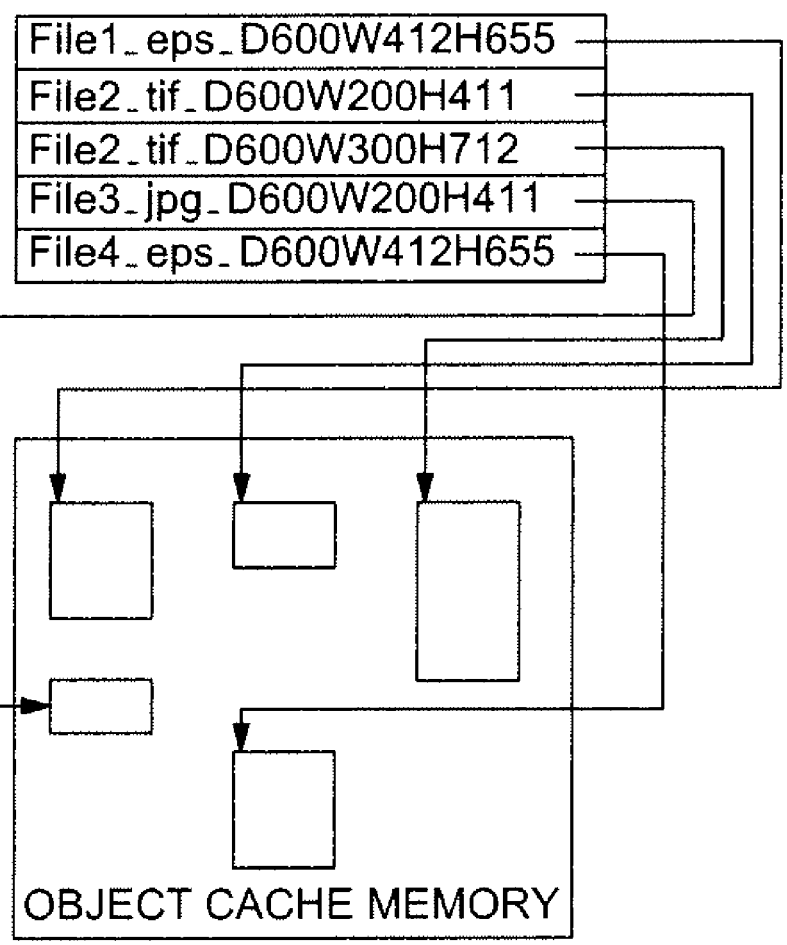
FIG. 5 shows a schematic diagram indicating an example of an object management table embodied in the present invention.
Figure 6:
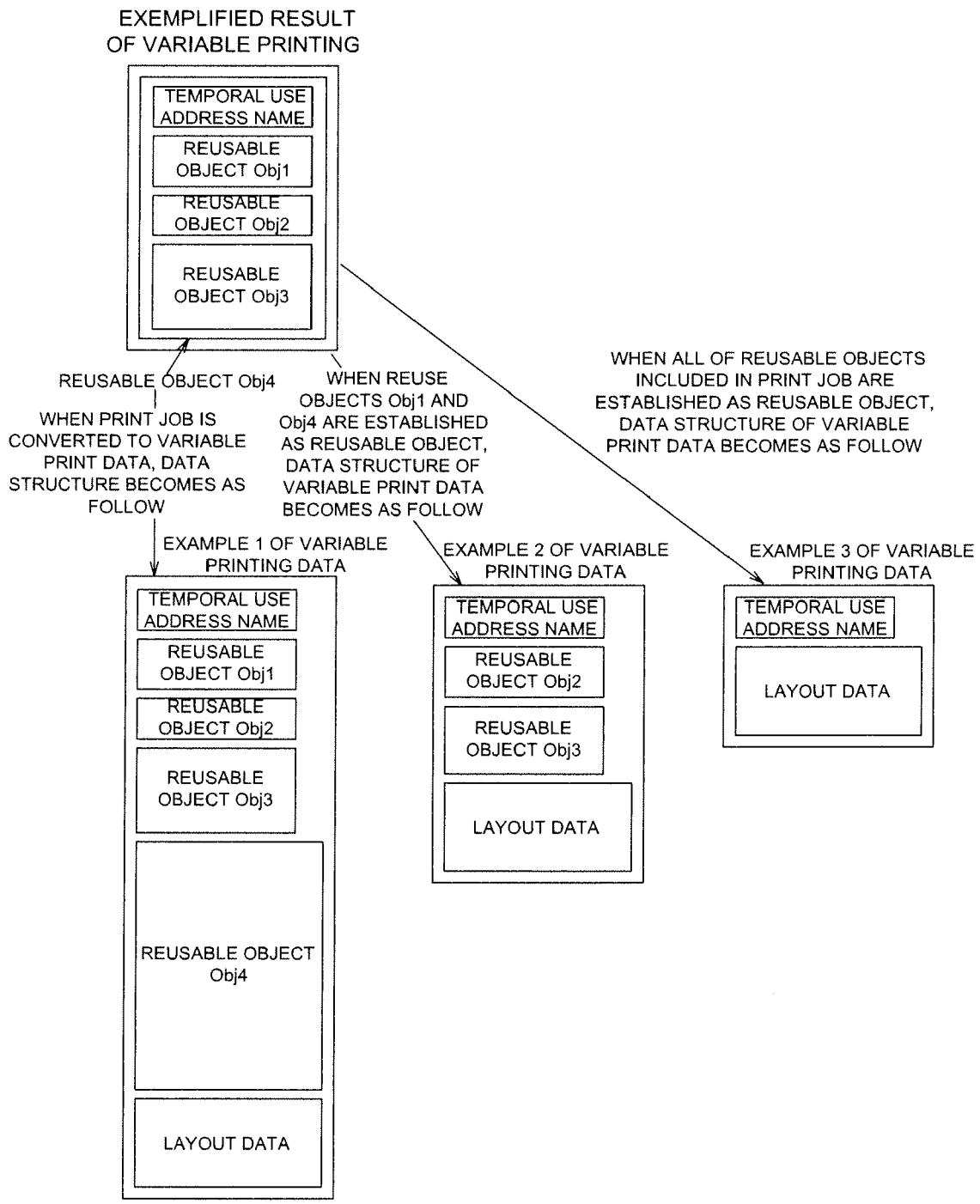
FIG. 6 shows a schematic diagram indicating a result of a variable printing operation and data structures of variable print data, embodied in the present invention.
Figure 7:
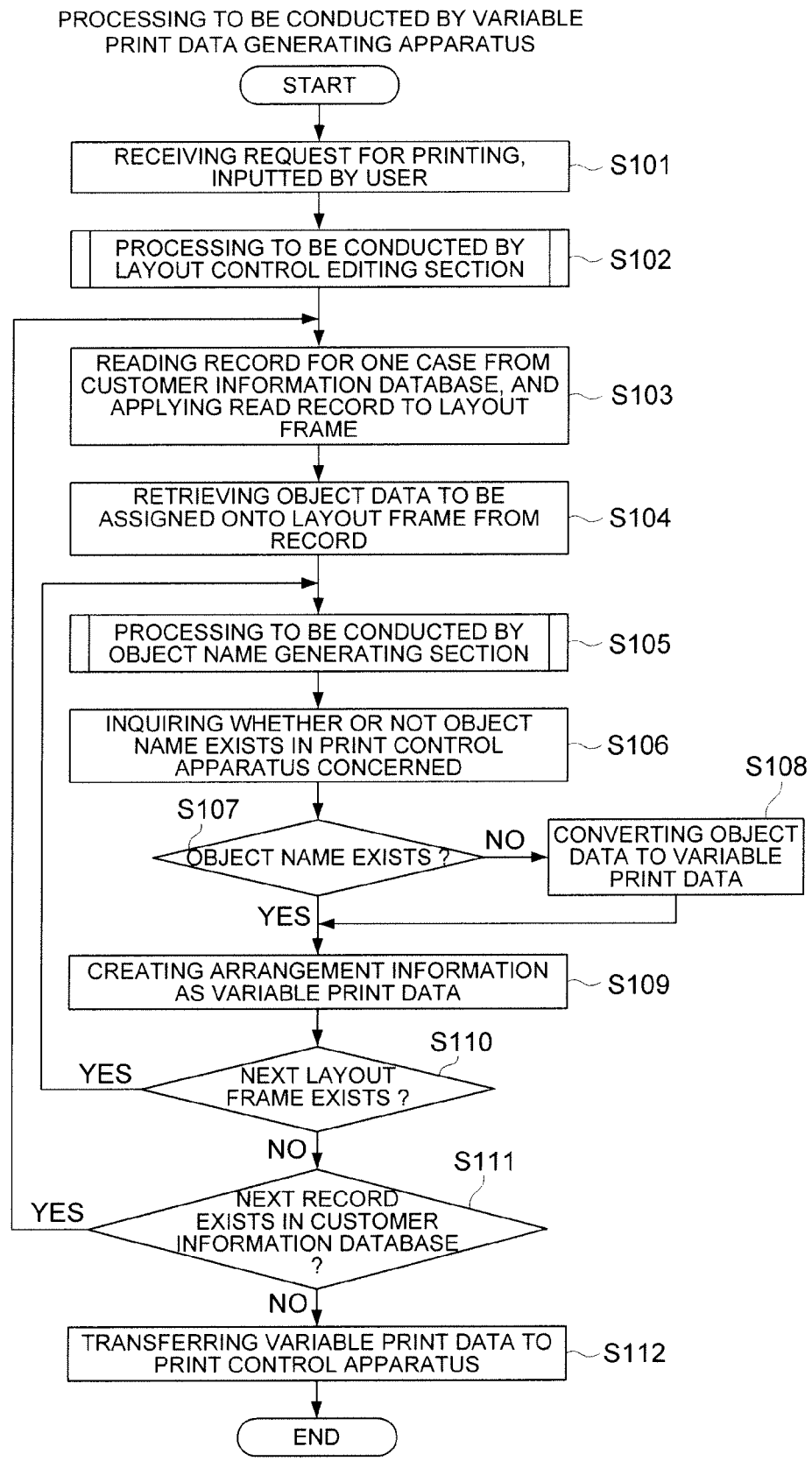
FIG. 7 shows a flowchart indicating processing procedures to be implemented in a variable print data generating apparatus embodied in the present invention.
Figure 8:
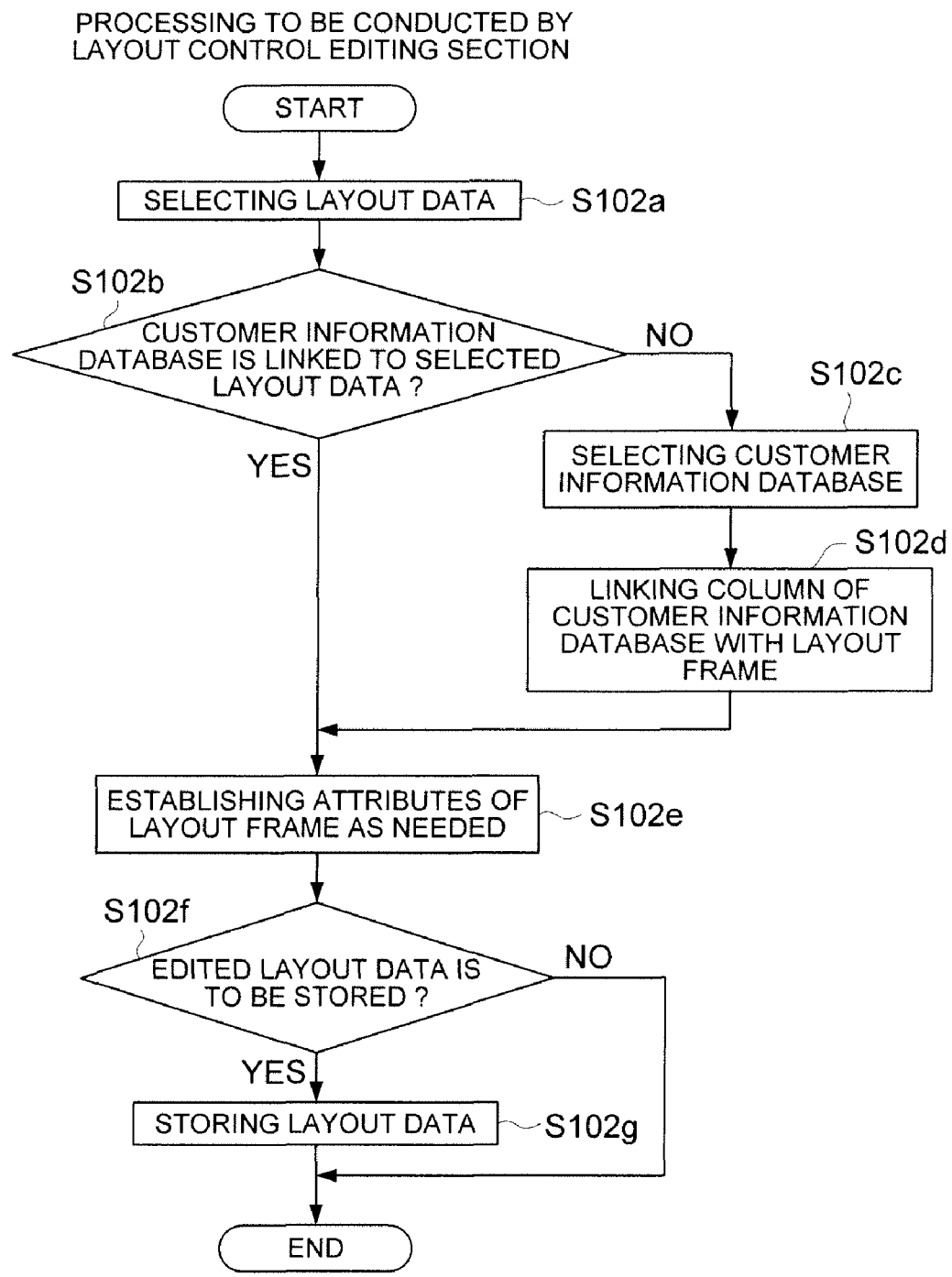
FIG. 8 shows a flowchart indicating processing procedures to be implemented by a layout control editing section included in a variable print data generating apparatus embodied in the present invention.
Figure 9:
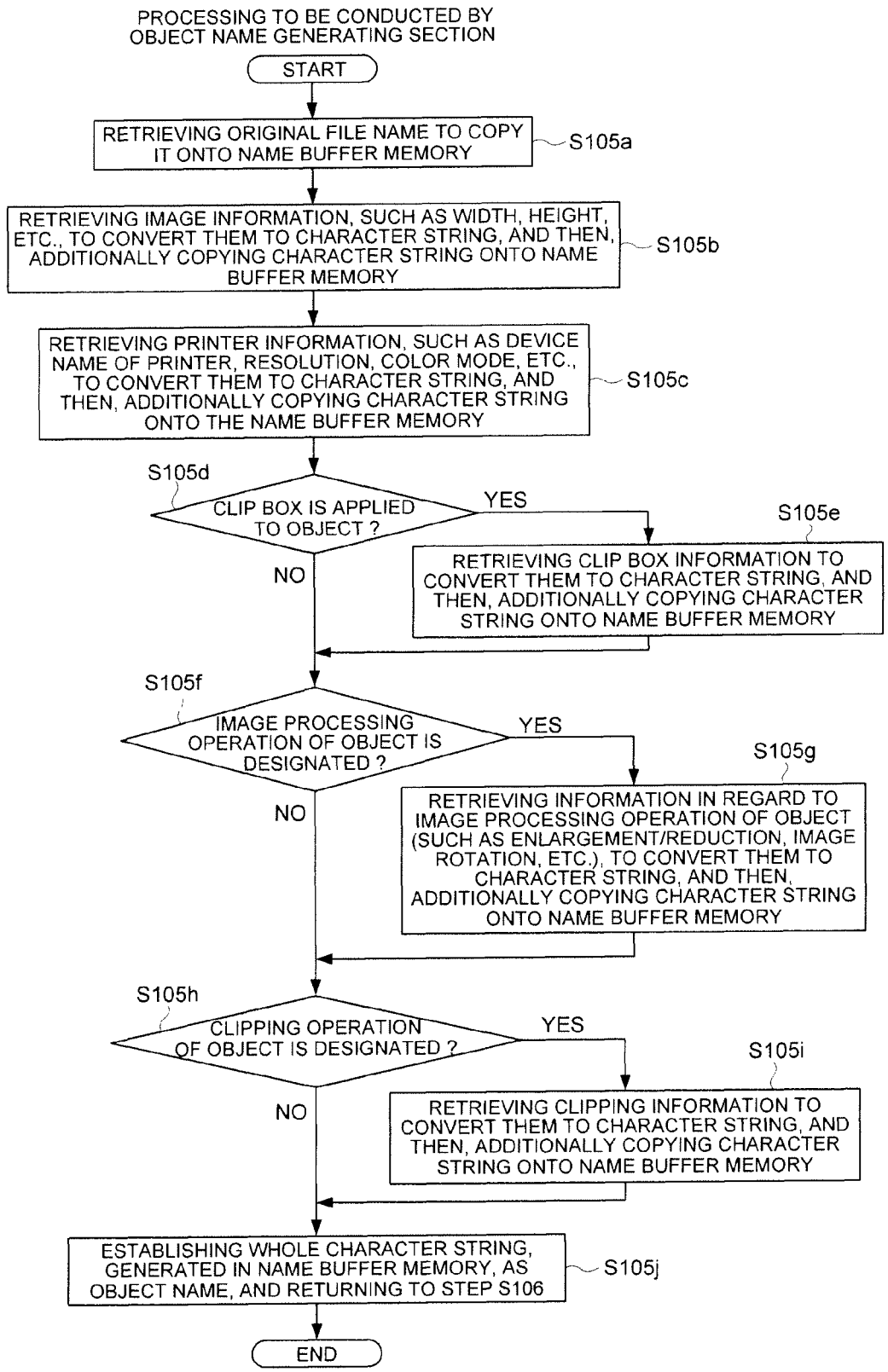
FIG. 9 shows a flowchart indicating processing procedures to be implemented by an object name generating section included in a variable print data generating apparatus embodied in the present invention.
Figure 10:
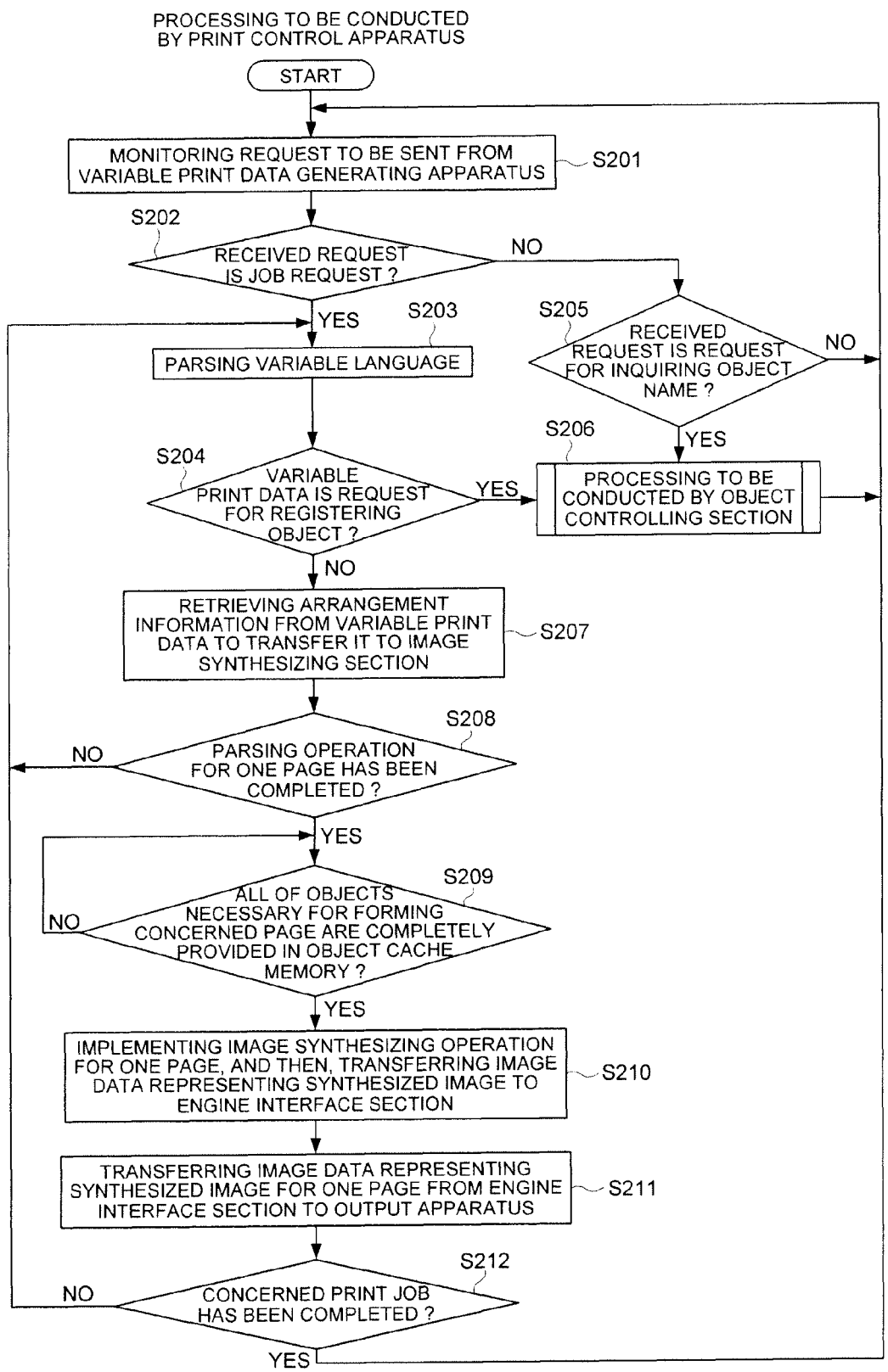
FIG. 10 shows a flowchart indicating processing procedures to be implemented in a print control apparatus embodied in the present invention.
Figure 11:
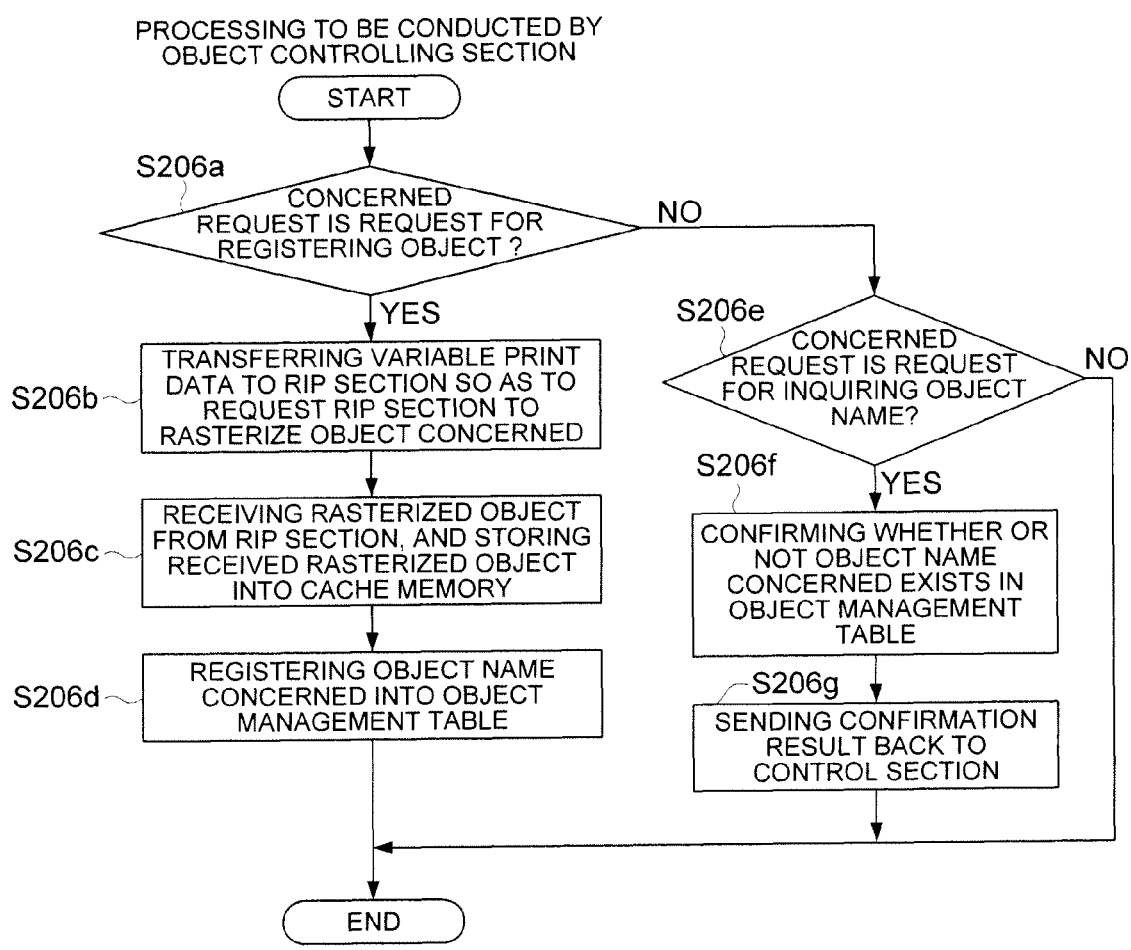
FIG. 11 shows a flowchart indicating processing procedures to be implemented by an object controlling section included in a print control apparatus embodied in the present invention.

In order to describe the preferred embodiment of the present invention in detail, referring to FIG. 1 through FIG. 11, an image processing system, an image processing method and an object name generation program, embodied in the present invention, will be detailed in the following. FIG. 1 shows a block diagram of a configuration of the variable printing system embodied in the present invention, FIG. 2 shows a block diagram indicating a configuration of various programs installed in the variable print data generating apparatus, and FIG. 3 shows a block diagram indicating a configuration of various programs installed in the print control apparatus. Further, FIG. 4 shows an explanatory schematic diagram for explaining a method for attaching the name to the object, FIG. 5 shows a schematic diagram indicating an example of the object management table, and FIG. 6 shows a schematic diagram indicating a result of the variable printing operation and data structures of the variable print data. Still further, FIGS. 7, 8 and 9 show flowcharts indicating processing procedures to be implemented in the variable print data generating apparatus. Yet further, FIGS. 10 and 11 show flowcharts indicating processing procedures to be implemented in the print control apparatus.

As shown in FIG. 1, a variable print data generating system 10, serving as an image processing system embodied in the present invention, is constituted by a variable print data generating apparatus 20 that generates print data written in a variable language, a print control apparatus 30 that parses the print data written in a variable language so as to generate image data for every page, and an output apparatus 40 that implements the printing operation based on the image data for every page. Further, the variable print data generating apparatus 20 and the print control apparatus 30 are coupled to each other through a network, such as a LAN (Local Area Network), a WAN (Wide Area Network), etc., while the print control apparatus 30 and the output apparatus 40 are coupled to each other through an exclusive interface line.

The variable print data generating apparatus 20 is constituted by a CPU (Central Processing Unit) 21, a ROM (Read Only Memory) 22, a RAM (Random Access Memory) 23, an HDD (Hard Disc Drive) 24, a NIC (Network Interface Card) 25, etc., to develop various kinds of programs stored in the ROM 22 and/or the HDD 24 onto the RAM 23 so that the CPU 21 can execute the programs developed on the RAM 23.

Further, the HDD 24 stores layout data for specifying the layout positions of the objects (contents) in the variable printing, object data before rasterizing, and a customer information database that includes user information. Still further, the NIC 25 conducts the communication processing operation for communicating with the print control apparatus 30.

The print control apparatus 30 is constituted by a CPU 31, a ROM 32, a RAM 33, a VIF (Video Interface) 34, a NIC 35, etc., to develop various kinds of programs stored in the ROM 32 onto the RAM 33 so that the CPU 31 can execute the programs developed on the RAM 33. Further, the RAM 33 includes a cache memory for storing rasterized object data (object cache memory) and a management table for managing object names (object management table). Still further, the VIF 34 is utilized for transmitting the synthesized page images to the output apparatus 40.

The output apparatus 40 serves as an image forming apparatus, such as a network printer, a multi-functional apparatus, etc.

FIG. 2 shows a block diagram indicating a configuration of various kinds of programs installed in the variable print data generating apparatus 20. By executing corresponding one of the programs installed, the computer serves as any one of a layout control editing section, a variable print controlling section, an object name generating section, an object presence-or-absence confirming section, a variable print data generating section, etc.

The layout control editing section generates and edits the layout data and stores them into the HDD 24. Further, the layout control editing section conducts an operation for linking an item of the customer information database, currently stored in the HDD 24, with a layout frame of the designated layout data, which includes the positioning information of the layout frame and the control information for pasting the object onto the layout frame.

Based on the information with respect to the resolution, the color mode, etc., of the print control apparatus 30 designated as the output destination, the variable print controlling section specifies the object to be pasted onto the layout frame.

With respect to the object specified by the variable print controlling section, the object name generating section generates an object name by using the information pertaining to the object concerned, according to the predetermined rule. In this connection, the naming method will be detailed later on.

The object presence-or-absence confirming section confirms whether or not the object name, named by the object name generating section, exists in the object cache memory of the print control apparatus 30 designated.

When the presence-or-absence confirming section determines that the object name exists, the variable print data generating section generates variable print data, which only includes the object name and the layout data, while, when the presence-or-absence confirming section determines that the object name does not exist, the variable print data generating section generates variable print data, which includes the object name, the layout data and the object data before rasterizing.

In this connection, it is applicable that each of the layout control editing section, the variable print controlling section, the object name generating section, the object presence-or-absence confirming section and the variable print data generating section is configured as either software (program) or hardware.

FIG. 3 shows a block diagram indicating a configuration of various kinds of programs installed in the print control apparatus 30. By executing corresponding one of the programs installed, the computer serves as any one of a variable language parsing section, an object management section, a RIP (Raster Image Processor) section, an image synthesizing section and an engine interface section.

The variable language parsing section parses the variable print data sent from the variable print data generating apparatus 20.

When the variable language parsing section reveals that the variable print data, currently under parsing, includes an object to be stored in the cache memory, the object controlling section extracts the object concerned and its object name from the variable print data.

The RIP section rasterizes the object concerned, so as to store the rasterized object data into the cache memory and to register the object name into the object management table.

Based on the layout data parsed by the variable language parsing section, the image synthesizing section synthesizes the rasterized object data with each other, to create image data for every page.

The engine interface section transfers the image data, created by the image synthesizing section for every page, to the output apparatus 40.

In this connection, it is applicable that each of the variable language parsing section, the object management section, the RIP section, the image synthesizing section and the engine interface section is configured as either software (program) or hardware.

Next, the method for naming an object, to be employed in the object name generating section (or object name generating program) of the variable print data generating apparatus 20, will be detailed in the following.

Conventionally, since the object names have been simply used for discriminating the various kinds of objects from each other, for instance, a superficial name such as "File1.tif" has been employed as the object name. Therefore, only by viewing such the simple name, it is impossible to recognize what kind of object the concerned object is, resulting in a cause of printing error. This is because, the processing parameters that is to be utilized for rasterizing the object (for instance, resolution, a width of image, a height of image, a color mode, etc.), could not be derived from such the superficial name.

To overcome the abovementioned drawback, according to the embodiment of the present invention, the information pertaining to the object, such as image information of the object, device information of the output apparatus 40, etc., is added to the original file name (superficial name) of the object concerned. For instance, as shown in FIG. 4, the object name of "File1.tif_D600W412H655_DV22C-KM_CMYK" is denominated to the object indicated as follow.

OBJECT ORIGINAL FILE NAME: File1.tif
RESOLUTION: 600 dpi
WIDTH OF IMAGE: 412 pixels
HEIGHT OF IMAGE: 655 pixels
DEVICE NAME OF PRINTER: 22C-KM
COLOR MODE: color (CMYK)

As indicated in the above, since the object name is generated by using the information pertaining to the object, such as the image information, the device information, etc., according to the predetermined rule, it is possible to recognize what kind of object the current object is. This results in a prevention of the object selection error. According to the abovementioned feature, it becomes possible to widen the exploit range of the object, and to store a lot of objects into the cache memory. As a result, by increasing the reuse ratio of the rasterized object, it becomes possible to improve the processing efficiency of the system.

The naming rule abovementioned is merely an example of various kinds of naming methods. When the object image is cut off from the image file by using the clip box, it is also possible to attach the clip box information for specifying the cut-off position to the object name. For instance, when the left-lower coordinate position is defied as (x=−1, y=0), while the right-upper coordinate position is defied as (x=200, y=100), it is applicable that the position (−1, 0, 200, 100), serving as the information of the clip box coordinate position, is represented as "CB__−1__0__200__100", which is to be attached to the object name concerned. In this case, the whole object name is determined as:
"File1.tif_D600W412H655_CB__−1__0__200__100_DV22C-KM_CMYK".

Further, when a kind of image conversion processing, such as an image size enlargement/reduction processing, a image rotation processing, etc., has been applied to the object, it is also possible to attach the information for specifying the image operation, such as a Transformation Matrix, etc., to the object name concerned. For instance, when the object image has been rotated anticlockwise at 90°, it is applicable that the Transformation Matrix (0, 1, −1, 0, 0, 0), representing the anticlockwise rotation at 90°, is represented as "TM0__1__−1__0__0__0", which is to be attached to the object name concerned. In this case, the whole object name is determined as:
"File1.tif_D600W412H655_DV22C-KM_CMYK_TM0__1__−1__0__0__0".

Still further, when the object image is cut off from the image rotated anticlockwise at 90° as abovementioned by employing a clip rectangular, it is also possible to attach the clipping information for specifying the cut-off position to the object name. For instance, when the left-lower coordinate position is defied as (x=0, y=0), while the right-upper coordinate position is defied as (x=90, y=100), it is applicable that the position (0, 0, 90, 100), serving as the information of the clip rectangular coordinate position, is represented as "CR__0__0__90__100", which is to be attached to the object name concerned. In this case, the whole object name is determined as:
"File1.tif_D600W412H655_DV22C-KM_CMYK_TM0__1__−1__0__0__0_CR__0__0__90__100".

In this connection, although, in the present embodiment, the system is so constituted that the processing parameters and information pertaining to the object, such as a width of image, a height of image, a device name of the printer, a resolution, a color mode, clip box information, image operating information, clipping information, etc., are attached to the object name concerned, it is applicable that the object name includes information sufficient for specifying the image data acquired by rasterizing the object, as the information pertaining to the object.

Next, the object management table for managing the object names, which are generated in accordance with the abovementioned rule, will be detailed in the following.

As shown in FIG. 3, the RAM 33, provided in the print control apparatus 30, includes the object management table and the object cache memory. FIG. 5 shows a schematic diagram indicating the relationships between the items listed in the object management table and the objects stored in the object cache memory. The object management table is constituted by the object names and address information for indicating the locations in the object cache memory, in each of which a corresponding one of the objects is stored, so as to link the object names and the real objects with each other. Accordingly, by retrieving the object management table, it becomes possible to detect a presence-or-absence of the object concerned and to read out the object from the object cache memory.

In this connection, according to the present embodiment, the object management table is provided in the print control apparatus 30 only. This is because; it is assumed that the variable print data generating apparatus 20 would possibly transmit the variable print data to a plurality of print control apparatuses 30. Concretely speaking, if the system is so constituted that the object management table is provided in the variable print data generating apparatus 20, it becomes necessary for variable print data generating apparatus 20 side to provide a plurality of the object management tables, each of which corresponds to each of the plurality of print control apparatuses 30, in advance, and further, when a certain object is deleted and/or registered from/into the variable print data generating apparatus 20, it becomes impossible to maintain the consistency between the contents of the object management table and the current status of the object concerned, unless the corresponding items in the database stored in the variable print data generating apparatus 20 are revised so as to always synchronize it with current status of the object concerned. Therefore, to avoid such the cumbersome operations, the object management table is operated only within each of the print control apparatuses 30, so as to maintain the consistency between the object management table and the contents of the object cache memory, both provided in corresponding one of the print control apparatuses 30, every time when deletion and/or registration of the object concerned occurs. Accordingly, the variable print data generating apparatus 20 can refer the object management table, having the consistency and provided in each of the print control apparatuses 30, so as to confirm what kind of variable print data should be transferred to corresponding one of the print control apparatuses 30 to output the variable printing images correctly. By generating the variable print data after confirming the above, it is possible to securely obtain the printing results expected by the user.

Next, an example of the variable printing will be detailed in the following.

FIG. 6 shows an imaginary schematic diagram indicating an example of the variable printing, and specifically indicating difference of data amount between a case that the objects are not reused and other cases that the objects are reused. In case of variable print data in which an address name, a reuse object Obj1, a reuse Object obj2, a reuse object Obj3 and a reuse object Obj4 are combined as "EXAMPLE OF VARIABLE PRINTING RESULT" shown in FIG. 6, the reuse ratio of the object increases, this result in that the amount of variable print data decreases.

For instance, "EXAMPLE 1 OF VARIABLE PRINTING DATA" indicates a data structure when the print control apparatus 30 is made to implement the processing operations of the variable print data in such state that none of the objects are stored in the object cache memory. In this case, since no rasterized object resides in the object cache memory and the reuse objects Obj1, Obj2, Obj3 and Obj4 are included in the variable print data, the data amount becomes large. "EXAMPLE 2 OF VARIABLE PRINTING DATA" indicates another data structure in such case that the reuse objects Obj1 and Obj4 are reused. In this case, since the variable print data includes the reuse objects Obj2 and Obj3 only, the data amount drastically reduced, compared to "EXAMPLE 1 OF VARIABLE PRINTING DATA". "EXAMPLE 3 OF VARIABLE PRINTING DATA" indicates still another data structure in such case that all of the reuse objects Obj1 through Obj4 are reused. In this case, since the variable print data includes none of the reuse objects, the data amount can be reduced at the lowest level.

Next, the concrete processing to be implemented in the variable print data generating system 10, embodied in the present invention, will be detailed in the following.

The variable print data generating apparatus 20 utilizes the object name, generated according to the method for naming the object to be employed in the process of generating the variable print data, in order to confirm whether or not the rasterized object is stored in the cache memory provided in the print control apparatus 30. When determining that the rasterized object concerned is stored in the cache memory, the variable print data generating apparatus 20 generates such the variable print data that reuses the rasterized object stored in the cache memory, while, determining that the rasterized object concerned is not stored in the cache memory, the variable print data generating apparatus 20 generates such the variable print data that includes the object data before rasterizing. The print control apparatus 30 conducts operations for managing the rasterized objects by using the object names generated in the variable print data generating apparatus 20, and sends the reply for the object-name presence-or-absence confirmation inquiry sent from the variable print data generating apparatus 20 back to the same, and further, implements the necessary processing when the variable print data is sent as a job from the variable print data generating apparatus 20. Referring to FIG. 7 through FIG. 11, the processes to be conducted by the variable print data generating apparatus 20 and the print control apparatus 30 will be detailed one by one in the following.

<Process to be Conducted by Variable Print Data Generating Apparatus>

As shown in FIG. 7, upon receiving a request for printing, inputted by the user in Step S101, the layout control editing section generates layout data in Step S102. The concrete processing to be conducted in Step S102 by the layout control editing section is illustrated in the flowchart shown in FIG. 8. In Step S102a, the layout control editing section selects layout data set, which is in conformity with the request for printing, inputted by the user, from a plurality of layout data sets stored in advance in the HDD 24, and, in Step S102b, determining whether or not the customer information database is linked to the selected layout data. When determining that the customer information database is not linked to the selected layout data (Step S102b; No), the layout control editing section selects the customer information database in Step S102c, and then, links the items (column) of the customer information database with the layout frame in Step S102d. Successively, in Step S102e, the layout control editing section establishes the attributes of the layout frame, including, for instance, a width and height of the object to be pasted onto the layout frame and image processing operations to be applied (such as a size enlargement/reduction processing, an image rotation, an operation for fitting the object to the size of the layout frame, etc.), as needed. Still successively, when determining that the layout data established or modified is to be stored (Step S102f; Yes), the layout control editing section stores the layout data into the HDD 24 in Step S102g.

Further, returning to the flowchart shown in FIG. 7, in Step 103, the variable print controlling section reads a record (data set for a single entry concerned) from the customer information database linked by the layout control editing section, so as to apply the read record to the layout frame of the selected layout. Successively, in Step S104, based on the record read from the customer information database, the variable print controlling section specifies object data to be assigned onto the layout frame, to retrieve the object data from the HDD 24, and then, acquires attributes information, such as a width, a height, image processing operations, etc., established with respect to the layout frame.

Still successively, the variable print controlling section transfers the object data retrieved from the HDD 24 to the object name generating section, which generates the object name in Step S105. FIG. 9 shows the flowchart illustrating the processing flow to be conducted by the object name generating section. At first, in Step S105a, the object name generating section retrieves the original file name of the object concerned, to copy the original file name onto a name buffer memory. Successively, in Step S105b, the object name generating section further retrieves image information of the object, such as a width, a height, etc., to convert them to a first character string, and then, additionally copies the first character string onto the name buffer memory. Still successively, in Step S105c, the object name generating section still further retrieves the printer information, such as a device name of the printer, a resolution, a color mode, etc., to convert them to a second character string, and then, additionally copies the second character string onto the name buffer memory. Still successively, in Step S105d, the object name generating section determines whether or not the clip box is applied to the object. When determining that the clip box is applied to the object concerned (Step S105d; Yes), the object name generating section still further retrieves clip box information, to convert them to a third character string, and then, additionally copies the third character string onto the name buffer memory in Step S105e. Still successively, in Step S105f, the object name generating section determines whether or not the image processing operation of the object is designated. When determining that the image processing operation of the object is designated (Step S105f; Yes), in Step S105g, the object name generating section still further retrieves information in regard to the image processing operation of the object (such as a image size enlargement/reduction, an image rotation, etc.), to convert them to a fourth character string, and then, additionally copies the fourth character string onto the name buffer memory. Yet successively, in Step S105h, the object name generating section determines whether or not the clipping operation of the object is designated. When determining that the clipping operation of the object concerned is designated (Step S105h; Yes), in Step S105i, the object name generating section yet further retrieves clipping information, to convert them to a fifth character string, and then, additionally copies the fifth character string onto the name buffer memory. Then, in Step S105j, the object name generating section establishes the whole character string, generated in the name buffer memory, as the object name of the object concerned and returns to Step S106 in the flowchart shown in FIG. 7.

Further, returning to the flowchart shown in FIG. 7, in Step S106, the object presence-or-absence confirming section inquires whether or not the object name, generated by the object name generating section, exists within the object management table provided in the print control apparatus 30, serving as the output destination of the object concerned, from the print control apparatus 30 concerned. When determining that the object name does not exists (Step S107; No), the variable print data generating section converts the object data to a part of variable print data in Step S108. Successively, in Step S109, the variable print data generating section creates arrangement information of the layout frame as another part of variable print data. Still successively, in Step S110, the variable print data generating section determines whether or not the next layout frame exists, so as to repeat the processing in Step S105 through Step S109 with respect to all of the layout frames. Still successively, in Step S111, the variable print data generating section determines whether or not the next record exists in the customer information database, so as to repeat the processing in Step S103 through Step S110 with respect to all of the records. Then, at the time when the processing for all of the records has been completed, in Step S112, the variable print data generating section transfers the whole variable print data generated in the above process to the print control apparatus 30 as the print job.

<Processing to be Conducted by Print Control Apparatus>

As shown in FIG. 10, in Step S201, the control section monitors the request to be sent from the variable print data generating apparatus 20. When determining that the received request is a job request (Step S202; Yes), the control section makes the variable language parsing section parse the variable language in Step S203. When the variable print data is the request for registering the object (Step S204; Yes), the control section requests the object controlling section to conduct its processing in Step S206. On the other hand, when determining that the received request is not a job request (Step S202; No), the control section further determines whether or not the received request is a request for inquiring the object name, in Step S205. When determining that the received request is not the request for inquiring, the control section makes the processing return to Step S201, while, when determining that the received request is the request for inquiring, the control section requests the object controlling section to conduct its processing in Step S206.

FIG. 11 shows a flowchart illustrating the processing flow to be conducted by the object controlling section. At first, in Step S206a, the object controlling section determines whether or not the request is a request for registering the object. When determining that the concerned request is the request for registering the object (Step S206a; Yes), the object controlling section transfers the variable print data to the RIP section so as to request the RIP section to rasterize the object concerned in Step S206b. Successively, in Step S206c, the object controlling section receives the rasterized object from the RIP section, and stores the received rasterized object into the cache memory. Still successively, in Step S206d, the object controlling section registers the object name of the rasterized object concerned into the object management table. On the other hand, when determining that the concerned request is not the request for registering the object (Step S206a; No), the object controlling section further determines whether or not the request is a request for inquiring the object name in Step S206e. When determining that the concerned request is the request for inquiring the object name, the object controlling section confirms whether or not the object name of the concerned object exists in the object management table in Step S206f, and then, in Step S206g, sends the confirmation result back to the control section.

Returning to the flowchart shown in FIG. 10, in Step S207, the variable language parsing section retrieves the arrangement information from the variable print data to transfer it to the image synthesizing section. Successively, in Step S208, determining whether or not the parsing operation for one page has been completed, the variable language parsing section returns to Step S203 so as to repeat the operation for parsing the variable language, when determining that the parsing operation for one page has not been completed (Step S208; No). When determining that the parsing operation for one page has been completed (Step S208; Yes), the object controlling section determines whether or not all of objects necessary for forming the concerned page are completely provided in the object cache memory in Step S209. When determining that all of the objects are completely provided (Step S209; Yes), the control section makes the image synthesizing section implement the image synthesizing operation for one page, and then, in Step S210, transfers image data representing the synthesized image to the engine interface section. Then, in Step S211, the engine interface section further transfers the image data representing the synthesized image to the output apparatus 40. Still successively, in Step S212, the control section determines whether or not the concerned print job has been completed. When determining that the concerned print job has not been completed (Step S212; No), the control section makes the processing return to Step S203 so as to repeat the operation for parsing the variable language, while, when determining that the concerned print job has been completed (Step S212; Yes), makes the processing return to Step S201 so as to monitor the request to be sent from the variable print data generating apparatus 20.

As abovementioned, the object name generating section, provided in the variable print data generating apparatus 20, utilizes the information pertaining to the object, in order to generate the object name of the object concerned, while, the rasterized object data, acquired by rasterizing the object concerned, is stored in the object cache memory provided in the print control apparatus 30, and at the same time, the object name of the object concerned is registered in the object management table. Further, when receiving the job request, the variable print data generating apparatus 20 inquires whether or not the rasterized object to be used in the job concerned is stored in the object cache memory from the print control apparatus 30, so as to generate the variable print data, based on the contents of the reply to the above inquiry. Therefore, according to the abovementioned embodiment, it becomes possible not only to prevent the system from generating printing errors, but also to increase the reuse ratio of the object, resulting in an improvement of processing efficiency of the system as a whole.

In this connection, the more the rasterized objects are stored in the cache memory, the further the processing efficiency can be improved. However, since a certain physical limitation limits the capacity of the memory area of the object cache memory provided in the print control apparatus 30, the number of objects memorable in the object cache memory is also limited to a certain extent. On the other hand, among the rasterized objects registered in the object cache memory, some objects are reused frequently (having a high reuse frequency), while other some objects are reused scarcely (having a low reuse frequency). Further, although the rasterized objects are stored in the cache memory so as to save the time necessary for rasterizing each of the objects at a real-time mode, sometimes depending on the size and/or type of the object, there is no difference in necessary time between retrieving the rasterized object from the object cache memory and directly rasterizing the object concerned.

To cope with abovementioned facts, instead of evenly storing every rasterized object into the object cache memory, according to the present invention, it is also applicable that each of the rasterized objects is weighted on the basis of the values derived by evaluating the parameters (such as a number of usage, an object size, an object type, etc.) representing information that indicates a degree of necessity for storing the concerned object into the object cache memory, so as to preferentially store a rasterized object, whose degree of necessity is relatively high compared to other rasterized objects, into the object cache memory.

For instance, as shown in Table 1, it is assumed that the seven objects are registered in the object management table. In this case, each of the object types is converted to a numeral value according to the values indicated in Table 2, and then, a weighted value of each of the objects is calculated by employing Equation (1) indicated as follow.

TABLE 1

| Object Name | Number of Usage | Object Size | Object Type |
|---|---|---|---|
| Object_Image1 | 2 | 1.25 | Image |
| Object_Graphics3 | 1 | 10.30 | Graphics |
| Object_Image3 | 4 | 10.5 | Image |
| Object_Image2 | 6 | 20.25 | Image |
| Object_Graphics1 | 2 | 30.0 | Graphics |
| Object_Image5 | 10 | 58.2 | Image |
| Object_Image4 | 1 | 40.5 | Image |

TABLE 2

| Object Type | Established Value |
|---|---|
| Image | 10 |
| Graphics | 5 |

$$\text{Weighted Value} = (\text{Number of Usage}) \times (\text{Object Size}) + (\text{Object Type}) \quad (1)$$

Table 3 is derived by adding a column of "Weighted Value", in which the values calculated in the above are indicated, to Table 1. Further, the objects, indicated in Table 3, are sorted in order of the weighted values, the highest uppermost, in Table 4 serving as the object management table.

TABLE 3

| Object Name | Number of Usage | Object Size | Object Type | Weighted Value |
|---|---|---|---|---|
| Object_Image1 | 2 | 1.25 | Image | 12.5 |
| Object_Graphics3 | 1 | 10.30 | Graphics | 15.3 |
| Object_Image3 | 4 | 10.5 | Image | 52 |
| Object_Image2 | 6 | 20.25 | Image | 131.5 |
| Object_Graphics1 | 2 | 30.0 | Graphics | 65 |
| Object_Image5 | 10 | 58.2 | Image | 592 |
| Object_Image4 | 1 | 40.5 | Image | 50.5 |

TABLE 4

| Object Name | Number of Usage | Object Size | Object Type | Weighted Value |
|---|---|---|---|---|
| Object_Image5 | 10 | 58.2 | Image | 592 |
| Object_Image2 | 6 | 20.25 | Image | 131.5 |
| Object_Graphics1 | 2 | 30.0 | Graphics | 65 |
| Object_Image3 | 4 | 10.5 | Image | 52 |
| Object_Image4 | 1 | 40.5 | Image | 50.5 |
| Object_Graphics3 | 1 | 10.30 | Graphics | 15.3 |
| Object_Image1 | 2 | 1.25 | Image | 12.5 |

By keeping the rasterized objects, ranked at upper positions of the Table 4, in the object cache memory as long as possible, the processing efficiency can be improved. However, since the other rasterized objects, ranked at lower positions of the Table 4 (for instance, the two objects ranked at the lowest two positions and having the weighted values being less that 20), cannot contribute the improvement of the processing efficiency so much even if the two objects are kept in the object cache memory, the two objects concerned are deleted from the object cache memory. As abovementioned, by classifying the rasterized objects registered in the object management table into a group including the objects whose degrees of necessity are relatively high and another group including the other objects whose degrees of necessity are relatively low, and then, deleting the other objects, whose degree of necessity is relatively low, from the object cache memory, it becomes possible not only to effectively use the memory resources, but also to improve the reuse ratio of the rasterized objects as a whole.

In this connection, although the number of usage, the object size and the object type are employed as the parameters for calculating the weighted values in the abovementioned embodiment, the scope of the parameters is not limited to the above. Any kinds of arbitral information, possibly serving as the index of the necessity for storing the rasterized object into the object cache memory, can be employed as the parameter concerned, as well.

Further, although the variable printing is exemplified in the preferred embodiment described in the foregoing, the scope of the present invention is not limited to the variable printing. The present invention can be also applied to an arbitral kind of printing mode in which the rasterized object is stored in the cache memory to reuse it, as well. Still further, although it is premised that the images are printed on a kind of recording medium in the preferred embodiment described in the foregoing, the present invention can be also applied to such a case that an image, represented by the image data created by reusing the rasterized object data, is displayed on a screen of an arbitral display device, as well.

The present invention is available for an image processing system in which a rasterized object is stored in a cache memory to reuse it, and specifically available for a variable printing system.

According to the image processing system, the image processing method and the object name generation program, each exemplified in the aforementioned explanation and embodied in the present invention, the following effects can be attained.

(1) It becomes possible not only to prevent the system from generating printing errors, but also to increase the reuse ratio of the object, resulting in an improvement of processing efficiency of the system as a whole.

This is because, the object name of the object concerned is generated by utilizing information pertaining to the object, such as image information of the object, a device information of the output apparatus that outputs the object, etc., and then, the rasterized object, acquired by rasterizing the object concerned, is stored into the cache memory while correlating the rasterized object with its object name. Accordingly, an erroneous object cannot be selected even if the effective rang of the object concerned is widened, and it becomes possible to reuse the object in plural jobs.

(2) It becomes possible to reduce the memory capacity being necessary for the object cache memory.

This is because, each of the rasterized objects is weighted on the basis of the predetermined parameters, such as a number of usage, an object size, an object type, etc., representing information that indicates a degree of necessity for storing the concerned object into the object cache memory, so as to preferentially store a rasterized object, whose degree of necessity is relatively high compared to other rasterized objects, into the object cache memory.

While the preferred embodiments of the present invention have been described using specific term, such description is for illustrative purpose only, and it is to be understood that changes and variations may be made without departing from the spirit and scope of the appended claims.

What is claimed is:

1. An image processing system, comprising:
 a first apparatus that generates first data for designating a first job; and a second apparatus that rasterizes a plurality of objects based on the first data generated by the first apparatus so as to synthesize the plurality of objects;

wherein, with respect to each of the plurality of objects, the first apparatus generates an object name of a concerned object according to a predetermined rule, by adding information pertaining to the concerned object, including any one of: a width of an image of the concerned object, a height of the image of the concerned object, information for specifying a cut position when the image is cut out, information for specifying an image operation when the image is enlarged, reduced or rotated, a device name of an apparatus that outputs the concerned object, a resolution and a color mode, which is necessary when rasterizing the concerned object, to a formal name of the concerned object; and wherein the second apparatus stores a plurality of rasterized objects, acquired by rasterizing the plurality of objects, into a cache memory, and registers object names, respectively generated with respect to the plurality of rasterized objects, into a table; and wherein, when generating second data for designating a second job being not prior to the first job, the first apparatus inquires whether or not object names of rasterized objects to be used in the second job are registered in the table from the second apparatus, so as to add an object unregistered in the table to the second data.

2. The image processing system of claim 1, wherein the second apparatus calculates a weight of each of the plurality of rasterized objects, which is stored in the cache memory and an object name of which is registered in the table, based on at least one of predetermined parameters indicating necessity for storing the concerned object into the cache memory, so as to delete a specific object, whose necessity is relatively low, from the cache memory, and to delete an object name of the specific object from the table.

3. The image processing system of claim 2, wherein the predetermined parameters includes at least one of a number of times using the concerned object, a size of the concerned object and a type of the concerned object.

4. An image processing method to be employed in an image processing system, which includes a first apparatus that generates first data for designating a first job; and a second apparatus that rasterizes a plurality of objects based on the first data generated by the first apparatus so as to synthesize the plurality of objects; the image processing method comprising:

generating an object name of a concerned object with respect to each of the plurality of objects according to a predetermined rule in the first apparatus, by adding information pertaining to the concerned object, including any one of: a width of an image of the concerned object, a height of the image of the concerned object, information for specifying a cut position when the image is cut out, information for specifying an image operation when the image is enlarged, reduced or rotated, a device name of an apparatus that outputs the concerned object, a resolution and a color mode, which is necessary when rasterizing the concerned object, to a formal name of the concerned object;

storing a plurality of rasterized objects, acquired by rasterizing the plurality of objects, into a cache memory provided in the second apparatus; and registering object names, respectively generated with respect to the plurality of rasterized objects, into a table provided in the second apparatus;

wherein, when generating second data for designating a second job being not prior to the first job, the first apparatus inquires whether or not object names of rasterized objects to be used in the second job are registered in the table from the second apparatus, so as to add an object unregistered in the table to the second data.

5. The image processing method of claim 4, wherein the second apparatus classifies a weight of each of the plurality of rasterized objects, which is stored in the cache memory and an object name of which is registered in the table, based on at least one of predetermined parameters indicating necessity for storing the concerned object into the cache memory, so as to delete a specific object, whose necessity is relatively low, from the cache memory, and to delete an object name of the specific object from the table.

6. The image processing method of claim 5, wherein the predetermined parameters includes at least one of a number of times using the concerned object, a size of the concerned object and a type of the concerned object.

7. In an image processing system including a first apparatus that generates first data for designating a first job and a second apparatus that rasterizes a plurality of objects based on the first data generated by the first apparatus so as to synthesize the plurality of objects, a computer readable storage medium storing a computer executable program to be executed by the first apparatus, the program being executable by a computer to cause the computer to perform a process comprising:

generating an object name of a concerned object with respect to each of the plurality of objects according to a predetermined rule, by adding information pertaining to the concerned object, including any one of: a width of an image of the concerned object, a height of the image of the concerned object, information for specifying a cut position when the image is cut out, information for specifying an image operation when the image is enlarged, reduced or rotated, a device name of an apparatus that outputs the concerned object, a resolution and a color mode, which is necessary when rasterizing the concerned object, to a formal name of the concerned object;

wherein the second apparatus stores a plurality of rasterized objects, acquired by rasterizing the plurality of objects, into a cache memory provided in the second apparatus.

* * * * *